United States Patent [19]

Johnston

[11] 3,930,334
[45] Jan. 6, 1976

[54] HANGING APPARATUS FOR FALLS AND HANGING PLANT

[76] Inventor: Ervin F. Johnston, 7406 Stoneview Court, San Diego, Calif. 92119

[22] Filed: May 20, 1974

[21] Appl. No.: 471,661

[52] U.S. Cl. ............... 47/35; 40/106.21; 47/38; 239/17; 239/20; 248/318; D23/13
[51] Int. Cl.². A01G 9/02; A47G 7/02; B05B 17/08; F21P 7/00
[58] Field of Search ............ 47/35, 39, 1.2, 34.12, 47/38, 38.1, 34.1, 34.6; 248/318, 343; 211/113; 239/17, 18, 20, 22, 23, 127; 40/106.21; D23/13

[56] References Cited
UNITED STATES PATENTS

| | | | |
|---|---|---|---|
| 101,918 | 4/1870 | Rogers | 47/39 |
| 511,720 | 12/1893 | Angell et al. | 248/345 |
| 1,525,899 | 2/1925 | Tippit | 248/318 |
| 2,526,546 | 10/1950 | Dowsing | 239/17 X |
| 3,071,326 | 1/1963 | Benak | 239/20 |
| 3,174,688 | 3/1965 | Chatten | 47/38 X |
| 3,455,509 | 7/1969 | Balkin | 239/20 X |
| 3,568,927 | 3/1971 | Scurlock | 239/17 |
| 3,709,373 | 1/1973 | Aguilar | 211/113 |
| 3,772,827 | 11/1973 | Ware | 47/32 |
| 3,841,023 | 10/1974 | Carlyon, Jr. | 47/38 |

Primary Examiner—Edgar S. Burr
Assistant Examiner—Steven A. Bratlie

[57] ABSTRACT

A hanging apparatus for falls and hanging plant which includes a pair of liquid receptacles which are supported in respective top and bottom positions with the top liquid receptacle being substantially directly above the bottom receptacle. The top liquid receptacle is capable of dropping liquid from a plurality of locations to the bottom liquid receptacle, and the bottom liquid receptacle is positioned for and is capable of receiving the falling liquid so as to enable a multiple falls effect. At least one other receptacle is capable of supporting a hanging type plant. This plant receptacle is positioned above the bottom liquid receptacle, and the plant receptacle has a periphery which is different from the outside envelope of the falling liquid so that the hanging plant will not interfere with the falling liquid.

14 Claims, 5 Drawing Figures

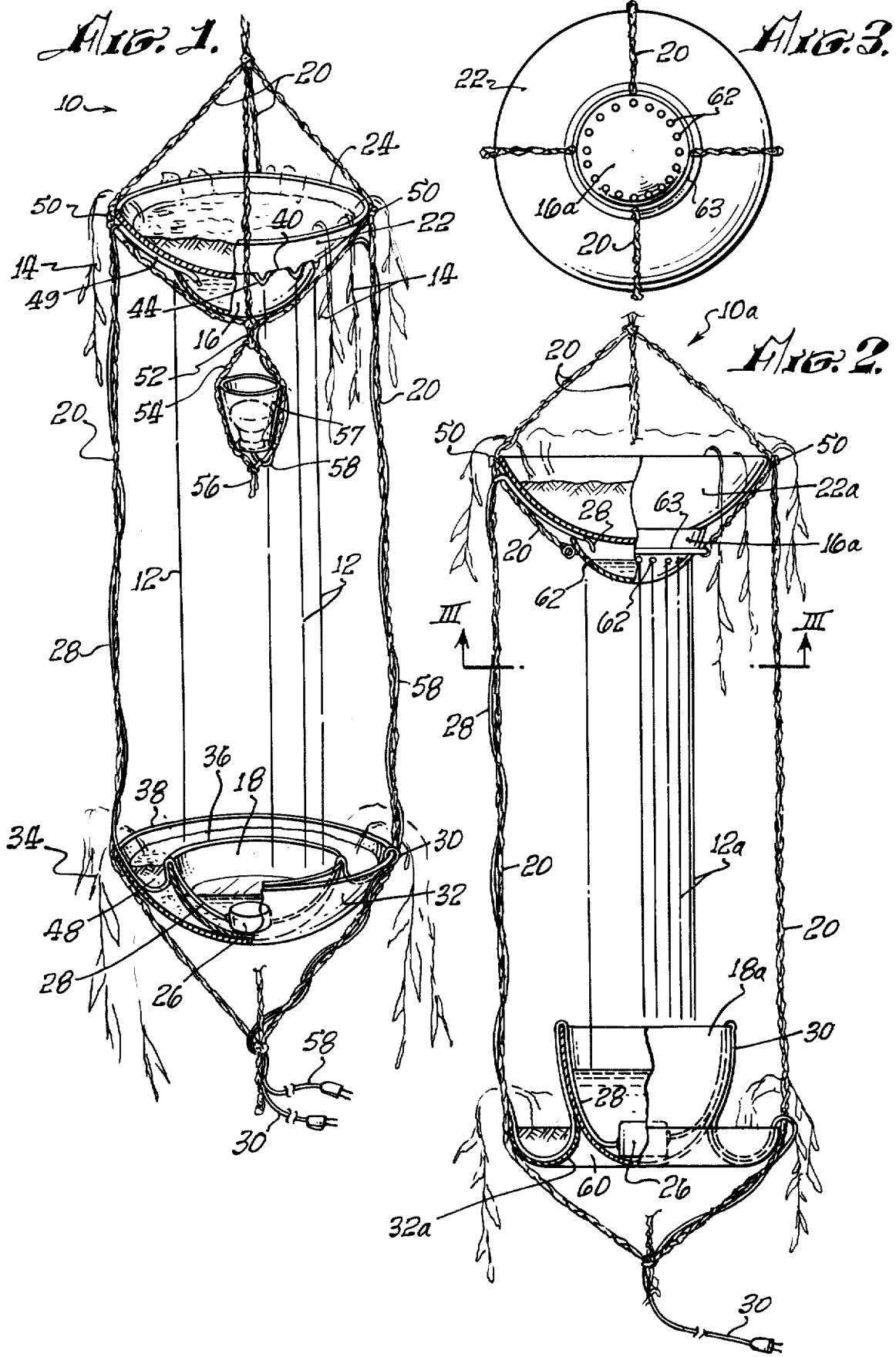

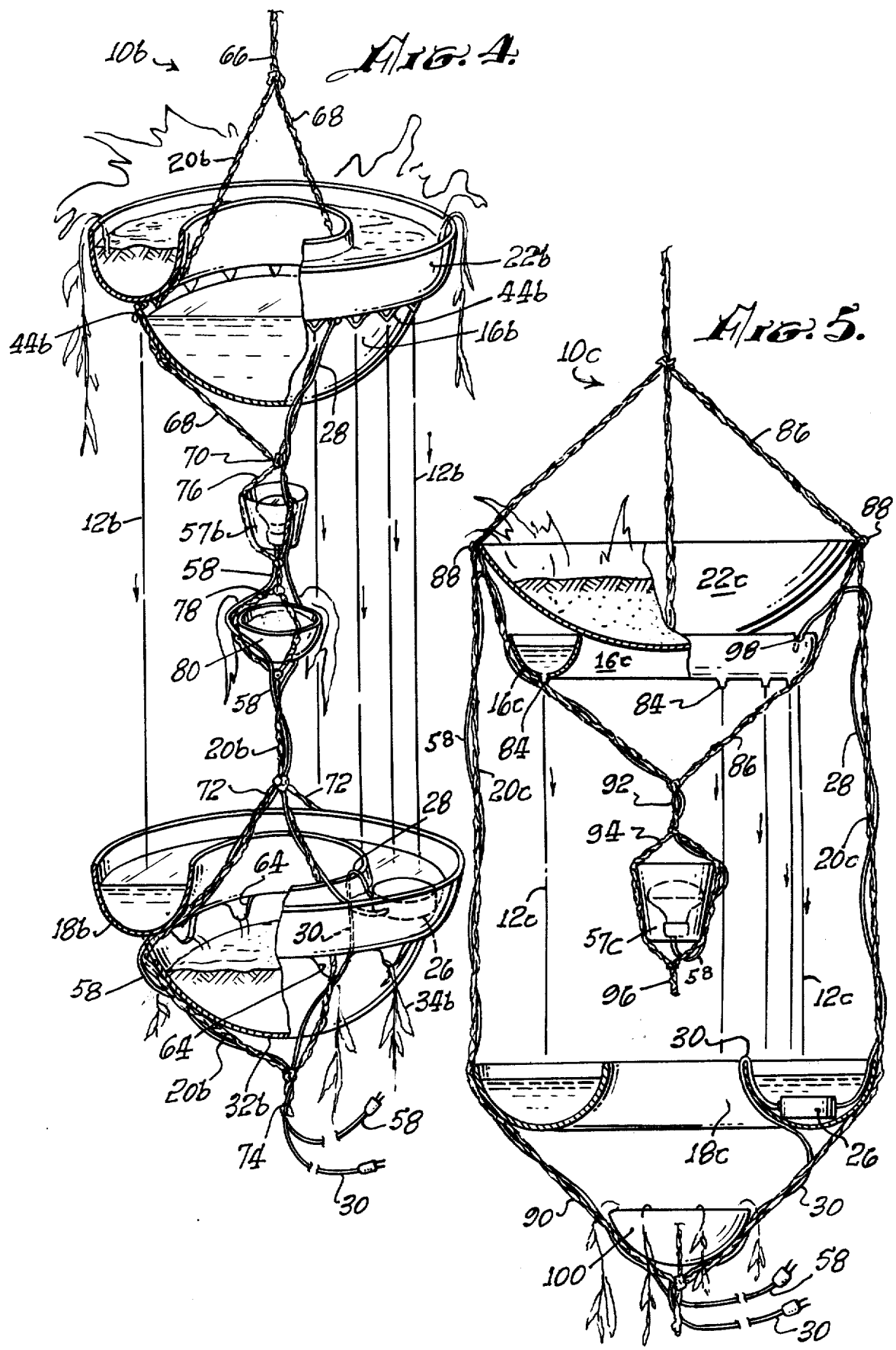

HANGING APPARATUS FOR FALLS AND HANGING PLANT

BACKGROUND OF THE INVENTION

With increasing number of apartments and condominiums, there has been a proportional increase in the demand for indoor plants. This demand is primarily based upon the desire to bring a little bit of the outdoors inside for a natural beautifying effect. Many of these plants are supported in various types of macrames which are capable of hanging the plants in single or double hanging pots. The macrames are a series of ropes which are normally woven by hand and which in combination provide the supporting saddles for each pot. The various macrame ropes are often braided from four strands of material, such as jute, hemp, cotton, wool, or similar type of fibrous material. Many new designs are new appearing on the market which make the hanging pots with their plants even more desirable as an interior decorative item.

SUMMARY OF THE INVENTION

The primary purpose of this invention is to combine another outside attraction, namely, a waterfall, with the combination of a hanging pot which has a hanging plant. The problem is to provide the true waterfall effect without interfering with the hanging plant. The present invention provides a combination which enables both the falling water and the hanging plant to extend downwardly without interference. This has been accomplished by providing a pair of liquid receptacles which are supported in respective top and bottom positions with the top liquid receptacle being substantially directly above the bottom receptacle. The top liquid receptacle is capable of dropping liquid from a plurality of locations to the bottom liquid receptacle, and the bottom liquid receptacle is positioned for and is capable of receiving the falling liquid so as to enable a multiple falls effect. At least one other receptacle, which is capable of supporting a hanging type plant, is supported above the bottom liquid receptacle. The plant receptacle has a periphery which is different from the outside envelope of the falling liquid so that the hanging plant will not interfere with the falling liquid. The various embodiments of the invention enable the additional combination of a light to illuminate the falls; the effect of the liquid, such as water, falling from a top plant to a bottom plant when in reality the liquid is falling from a top liquid receptacle to a bottom liquid receptacle; a uniform falls effect; and unique combinations of supporting ropes with the liquid and plant pots.

OBJECTS OF THE INVENTION

An object of the present invention is to provide a hanging apparatus for a falls and hanging plant.

Another object is to provide a hanging apparatus for a liquid falls and hanging plants wherein the falls appear to drop from one hanging plant to the other hanging plant when in reality the liquid is falling from a top liquid receptacle to a bottom liquid receptacle.

A further object is to provide a hanging apparatus for a falls and hanging plant which includes a light to illuminate the falls.

Still another object is to provide a hanging apparatus for a falls and hanging plant which is supported by a unique combination of ropes.

Yet another object is to provide various combinations of the aforementioned objects as desired.

Other objects, advantages and novel features of the invention will become apparent from the following detailed description of the invention when considered in conjunction with the accompanying drawings.

DESCRIPTION OF THE DRAWINGS

FIG. 1 is an isometric illustration of one embodiment of the invention which features the appearance of liquid falling from a top plant location to a bottom plant location when in reality the liquid is falling from a top liquid receptacle to a botom liquid receptacle.

FIG. 2 is an isometric illustration of another embodiment of the invention which is similar to the embodiment of FIG. 1.

FIG. 3 is a cross-sectional illustration of FIG. 2 taken along plane III — III.

FIG. 4 is an isometric illustration of still another embodiment of the invention which features a center location of the supporting ropes.

FIG. 5 is an isometric illustration of yet another embodiment of the invention which features a substantially uniform flow of the liquid even though the top liquid receptacle is off level and a light for illuminating the liquid falls effect.

DESCRIPTION OF THE PREFERRED EMBODIMENTS

Referring now to the drawings wherein like reference numerals designate like or similar parts throughout the several views, there is illustrated in FIG. 1 a hanging device 10 for a falls 12 and a hanging plant 14. The falls may be any suitable liquid, such as glycerin, water, or a mixture of glycerin and water. Many types of hanging plants are suitable such as Creeping Charlie, Ivy, Bridal Veil, or the many varieties of Wandering Jew.

The hanging apparatus 10 includes a pair of liquid receptacles 16 and 18. Means are provided for supporting the liquid receptacles in respective top and bottom positions with the top liquid receptacle 16 being substantially directly above the bottom liquid receptacle 18. The supporting means may include a series of ropes 20 which are combined in various ways to support the receptacles. Each of the ropes 20 may be made from smaller hand woven strands of jute, hemp, sisal, cotton, wool, and the like. In the embodiment of FIG. 1 four ropes 20 are utilized, three being illustrated in the figure, however, it is quite common to only use three such ropes for support purposes.

The top liquid receptacle 16 is capable of dropping liquid from a plurality of locations to the bottom liquid receptacle 18, and the bottom liquid receptacle 18 is positioned by the ropes 20 for receiving and is capable of receiving all of the falling liquid so as to enable a multiple falls effect.

The hanging device 10 includes another receptacle 22 which is capable of supporting the hanging type plant 14. The supporting means, such as the ropes 20, support this plant receptacle 22 above the bottom liquid receptacle 18. Further, it is important that this plant receptacle 22 have a periphery 24 which is different, that is smaller or larger, than the outside envelope of the falling liquid 12 so that the hanging plant 14 will not interfere with the falling liquid.

The description up to this point of the embodiment illustrated in FIG. 1 is common to the other embodiments which are illustrated in FIG. 2, FIG. 3, FIG. 4, and FIG. 5. As illustrated in FIG. 1, all of these embodiments may also have in common a submersible pump 26 of the type having an inlet and an outlet. The pump 26 is located within the bottom liquid receptacle 18. A tube 28 may be connected to the pump outlet and may extend upwardly through one of the flexible ropes 20 into the top liquid receptacle 16. This tube preferably remains secluded as much as possible so that the source or liquid for the top liquid receptacle 16 will be undisclosed. The submersible pump 26 also has an electric cord 30 which extends downwardly within a rope and terminates in a plug for a wall socket. Also, as illustrated in FIG. 1, the embodiments may have in common the bottom liquid receptacle 18 and the plant receptacle 22, which is above the liquid receptacle 18, each having an outer periphery which is larger than the outer periphery of the top liquid receptacle 16. However, this element is not essential since in the embodiment in FIG. 4 the uppermost plant receptacle may be omitted and an intermediate plant receptacle may be provide, as illustrated, which has a periphery which is smaller than a top liquid receptacle. The embodiment of FIG. 4 will be explained in detail hereinafter. All of the embodiments may have in common a substantially circular top edge for each receptacle.

As illustrated in FIG. 1 a second plant receptacle 32 may be supported by the ropes 20 at a bottom location for carrying another plant 34. The bottom liquid receptacle 18 has a periphery 36 which is smaller than the periphery 38 of the bottom plant receptacle 32. The bottom liquid receptacle 18 is mounted entirely within the vertical projection of the periphery 38 of the bottom plant receptacle. This structure provides a very important feature, namely, the catching of liquid within the bottom plant receptacle 32 should the bottom receptacles be caused to swing past the catching ability of the bottom liquid receptacle 18. This structure and feature is also common to the embodiment of FIG. 2. Further, these embodiments may have in common that the top and bottom plant receptacles each have a top edge which is substantially circular, and the diameters across these edges may be substantially equal. This arrangement is ideal for the supporting ropes 20 to extend downwardly in a parallel fashion between the top and bottom plant receptacles 22 and 32.

As illustrated in FIG. 1, the top plant receptacle 22 may be provided with a rounded bottom. The top edge 40 of the top liquid receptacle 16 may engage the rounded bottom of the top plant receptacle 22 so as to provide a seal therebetween. If desired, the top liquid receptacle 16 may be mounted to the bottom of the top plant receptacle 22 in a centered position by a bolt and nut combination (not shown) which extends through the bottoms of these receptacles and is sealed by suitable rubber washers (not shown). In order to enable the liquid to fall from the top liquid receptacle 16, the top edge 40 of the top liquid receptacle may be provided with a series of pouring spouts 44 which allow the liquid to exit from this receptacle and drop to the bottom liquid receptacle 18. The engagement of the top edge 40 of the top liquid receptacle 16 with the rounded bottom of the top plant receptacle 22 is significant from the standpoint of providing a seal which will prevent sloshing of the liquid from the receptacle 16 when something causes the receptacles to swing about their top support. It should be noted that the embodiment of FIG. 1 enables a circular falls effect, the envelope of which is accordingly circular. While all of the embodiments are shown with a circular falls it should be understood that other designs could be employed, such as rows of apertures which extend across the bottom of the receptacle.

As illustrated in FIG. 1, the bottom liquid receptacle 18 may rest within the interior of the bottom plant receptacle 32, and may have its top edge 36 slightly below the top edge 38 of the bottom plant receptacle. This will seclude the appearance of the bottom liquid receptacle 18 especially when there is some height to the plant 34 which is growing within the plant receptacle 32. The mounting of the top liquid receptacle 16 to the bottom of the top plant receptacle 22 gives the appearance that this is one receptacle so that the liquid exiting from the pouring spouts 44 appears to be coming from the top plant receptacle 22. This effect is accentuated when the plant 14 grows downwardly from the top plant receptacle 22. The total effect of the top and bottom arrangement of the receptacles is that the liquid is falling from the top plant receptacle 22 to the bottom plant receptacle 32 when in reality the liquid is falling from the top liquid receptacle 16 to the bottom liquid receptacle 18. This effect is especially curious to the observer when the pump 26, and the tube 28 are secluded so that the source of liquid for the top liquid receptacle 16 is unknown. This may be accomplished by covering the pump 26 and the tube 28 within the bottom liquid receptacle 18 by light rocks (not shown), such as volcanic rocks, thence extending the tube 28 down below the level of the soil 48 within the bottom plant receptacle 32, thence extending the tube 28 upward interiorily within one of the supporting ropes 20, thence extending the tube 28 downwardly within one of the supporting ropes for the top liquid receptacle 16, and thence extending the tube 28 into the top liquid receptacle 16 through one of the pouring spouts 44, after which the tube terminates within the top liquid receptacle 16 for discharging the liquid. The tube 28 may extend through a rigid tube 49 under the top plant receptacle 22 to protect it from being squeezed.

It is preferable that the ropes 20 provide top and bottom saddles for the respective top and bottom receptacles. As desired, the ropes may be woven into a column in their uppermost portion, thence divided into separate ropes above the top plant receptacle 22, thence each rope divided at 50 which is at the top edge 24 of the top plant receptacle 22 into one set of smaller ropes which support the top receptacles 22 and 16, and another set of smaller ropes which extend vertically downward and are woven into a pigtail which forms a saddle for the bottom receptacles 18 and 32. The ropes forming the saddle for the top receptacles 16 and 22 may be woven therebelow into a column 52, thence separated therebelow to form a departure 54, thence woven again therebelow to form a pigtail 56.

A light fixture 57, which may include a light socket and reflector, may be mounted within the departure 54 of the supporting ropes in a location intermediate the top and bottom liquid receptacles 16 and 18. It is important for the operation of the light 57 that in the area where the ropes pass under the liquid receptacle 16 to form the saddle 54 that the pouring spouts 44 are spaced sufficiently apart on each side of the ropes so that liquid will not drop onto these ropes and travel down to the light 57. The pouring spouts 44 may be omitted in the traversing area of these ropes so that all of the liquid will drop to the bottom liquid receptacle 18 without being caught by the ropes.

It is desirable that the light fixture 57 have a reflector which is bowl shaped or frusto-conical shaped, as illustrated in FIG. 1, and that it be directed upwardly toward the bottom of the top liquid receptacle 16 so that light can be reflected from the bottom of the top liquid receptacle 16 down onto the falling liquid column 12. This downward reflection may be enhanced by coating or glazing the bottom of the top liquid receptacle 16 with a light colored substance which is preferably white. The electric cord 58 for the light fixture 57 may extend from the bottom of the fixture, thence upwardly within one of the supporting ropes, thence within one of the saddle ropes, for the top receptacles, thence downwardly within one of the vertical supporting ropes, and thence downwardly within the pigtail below the bottom receptacles and terminating in a plug for insertion in a wall socket.

Coming now to the second embodiment, as illustrated in FIG. 2, this hanging apparatus 10a may be provided with a bottom plant receptacle 32a which is annular with a center hole 60 for receiving a bottom portion of the bottom liquid receptacle 18a. The bottom liquid receptacle 18a, which may be considerably higher than the receptacle 18 of FIG. 1, may rest within the center bottom hole area 60 of the bottom plant receptacle 32a. Accordingly, the ropes 20 will support the bottom plant receptacle 32a which will in turn support the bottom liquid receptacle 18a. The liquid carrying tube 28 and the electric cord 30 which extend from the submersible pump 26 may be secluded in a similar fashion as illustrated and described for the embodiment of FIG. 1. The annular configuration of the bottom plant receptacle 32a should result in a savings of weight, however, if desired the bottom plant receptacle can take on the configuration and the same size as the bottom plant receptacle 32 of the embodiment of FIG. 1. The higher configuration of the liquid receptacle 18a will ensure that none of the falling liquid splashes onto the surrounding structure.

The top plant receptacle 22a and the top liquid receptacle 16a may be substantially identical to the corresponding top receptacles in the embodiment of FIG. 1. The difference is in the exit ports for the liquid in the top liquid receptacle 16a. As illustrated in FIG. 3, the top liquid receptacle 16a has a series of apertures or spouts 62 which serve as orifices for the liquid to drop to the bottom liquid receptacle 18a. The apertures 62 may be arranged in a circular row. With such an arrangement the top receptacles 16a and 22a may be supported by a ring 63 which engages the bottom of the top liquid receptacle 16a. The ring 63 may in turn be supported by the smaller ropes 20 which extend downwardly from points 50. It should be noted, that with the aforementioned arrangement it is not critical that the top edge of the top liquid receptacle 16a be level to provide a uniform falls effect since a head of liquid will normally be provided above the apertures 62. In essence the embodiment of FIG. 2 is similar to the embodiment illustrated in FIG. 1 except for the differences noted hereinabove. If desired, a light fixture similar to that illustrated in FIG. 1 could be mounted by wires (not shown) which extend from the ring 63 in between the apertures 62 below the top receptacles provided it was waterproof of 12 volt so that there would be no danger if some of the falling liquid fell onto the light fixture. Alternatively, such a light fixture could even be mounted within the bottom liquid receptacle 18a so as to shine upwardly into the falling liquid column.

Coming now to the embodiment illustrated in FIG. 4, the hanging apparatus 10b illustrated therein may include the top plant receptacle 22a being annular and resting on top of the liquid receptacle 16b. A small space, however, may be provided therebetween by the supporting ropes 20b that pass therebetween. A bottom plant receptacle 32b may be supported by the ropes 20b in a bottom location, and the bottom liquid receptacle 18b may be annular and of such a size so that it can rest on the top of the bottom liquid receptacle 32b.

Again, a small space may be provided therebetween because of the supporting ropes passing between these two receptacles. The center area of the bottom plant receptacle 32b is available for growth of the plant 34b, and if desired, openings 64 may be provided within the bottom plant receptacle 32b for allowing the plant to exit and fall therefrom.

The supporting means may include three ropes 20b which are joined together at a top location 66, thence are parted therebelow to provide a top departure 68 of the ropes, thence are joined in an intermediate location 70, thence are parted below the intermediate location to provide a bottom departure 72 of the ropes, and thence are joined below the bottom departure to form a bottom portion or pigtail 74 of the ropes. The top liquid receptacle 16b may rest within the top departure 68 of the ropes, and the bottom plant receptacle 32b may rest within the bottom departure 72 of the ropes. In turn, the top plant receptacle 22b rests on top of the top departure 68 of the ropes as well as on top of the top liquid receptacle 16b, and the bottom liquid receptacle 18b rests on top of the bottom departure 72 of the ropes as well as on the top of the bottom plant receptacle 32b. With this configuration, the supporting ropes 20b form a column in the center of the hanging device which differs from the arrangements of the ropes illustrated in the other three embodiments.

Further, the intermediate portion 70 of the ropes may be parted to provide an intermediate departure 76 of the ropes. Within this departure 76 of the ropes there may be disposed a light fixture 57b which may be directed upwardly so that the light can shine on the bottom of the top liquid receptacle 16b and be reflected back down about the hanging device. The electric cord 58 for the light fixture 57b may extend downwardly within the intermediate portion 70 of the ropes, thence within one of the ropes of the departure 72, thence within the pigtail 74 of the ropes, and finally terminating in a plug for a wall socket.

The intermediate portion 70 of the ropes may be further parted to provide a second intermediate departure 78 which is located below the departure 76 for the light fixture 57b. The hanging device may include a third plant receptacle 80 which rests within the second intermediate departure 78 of the ropes. The periphery of the plant receptacle 80 should be smaller than the envelope of the falling liquid 20b so that there is no interference between the liquid and the plant.

The top liquid receptacle 16b may be provided with a plurality of pouring spouts 44b which may be spaced about the top edge of the receptacle. The circular column of falling liquid should correspond with the circular center of the annular bottom liquid receptacle 18b. In order to provide the source of liquid to the top liquid receptacle 16b the submersible pump 26 may be disposed in the bottom of the bottom liquid receptacle 18b on one side. The tube 28 may extend from the outlet of this pump to the inside edge of the bottom liquid receptacle 18b, thence into one of the ropes of the bottom departure 72, thence into the intermediate portion 70 of the ropes, thence into one of the ropes of the top departure 68, and thence between the bottom of the top plant receptacle 22b and the top of the top liquid receptacle 16b through the space which is provided for by the ropes which extend between these two receptacles. The tube 28 then extends downwardly into the top liquid receptacle 16b to provide a source of liquid therefor. The electric cord 30 from the sumbersible pump 26 may extend over the inside edge of the bottom liquid receptacle 18b, thence into one of the ropes of the bottom departure 72 of the ropes, thence into the pigtail 74, and thence terminating in a plug for insertion in a wall socket.

Coming now to the fourth embodiment, as illustrated in FIG. 5, this hanging apparatus 10c includes the top and bottom liquid receptacles 16c and 18c respectively being substantially annular. The cup size of the top liquid receptacle 16c may be substantially one-half the cup size of the bottom liquid receptacle 18c, as seen in cross-section, however, the circular bottom of the top liquid receptacle 16c may be substantially identical in diameter to the circular bottom liquid receptacle 18c. In this manner, the top liquid receptacle 16c may be provided with a plurality of apertures 84 in a row along the circular bottom of this receptacle so that liquid will fall in a circular pattern into the middle of the annular cup of the bottom liquid receptacle 18c. Because of the location of these apertures a substantially uniform flow of liquid from each aperture will be assured even though the top edge of the top liquid receptacle 16c may be somewhat off level.

In the embodiment of FIG. 5 it is preferable that the supporting ropes 20c be provided with a top departure 86 which separates at points 88 with a portion of the ropes extending downwardly to provide a bottom saddle 90 for supporting the bottom liquid receptacle 18c. The top liquid receptacle 16c may rest within the top departure 86 of the ropes and the top plant receptacle 22c may in turn rest within the opening and on the inside edge of the top liquid receptacle 16c. Below the departure 86 of the ropes, the ropes may be joined again at 92, thence parted at 94, and thence joined again therebelow at 96. A light fixture 57c may be disposed within the departure 94 of the ropes with its electric cord extending upwardly therein to the juncture point 88, thence downwardly within the ropes until it exits from the bottom thereof and terminates in a plug for insertion in a wall socket. The pump 26 may be disposed within the bottom liquid receptacle 18c, and the tube 28 may extend upwardly into one of the ropes 20c, thence downwardly within one of the ropes of the departure 86, and thence into the top liquid receptacle 16c through a groove 98 in the top edge of the top liquid receptacle 16c. The electric cord 30 for the pump 26 may extend upwardly, thence downwardly and into one of the ropes in the departure 90, thence downwardly until it exits the ropes and terminates in a plug for insertion in a wall socket.

If desired, another plant receptacle 100 may be disposed within the bottom departure 90 of the ropes below the bottom liquid receptacle 18c. The foilage from this plant receptacle would tend to hide the exiting of the electrical cords 30 and 58.

Obviously, many modifications and variations of the present invention are possible in the light of the above teachings, and, it is therefore to be understood that within the scope of the appended claims the invention may be practiced otherwise than as specifically described.

I claim:

1. A hanging waterfall and plant apparatus comprising: a pair of water receptacles; flexible means supporting and hanging the water receptacles in respective top and bottom positions with the top water receptacle hanging substantially directly above the bottom water receptacle; the top water receptacle having a plurality of openings therein for releasing water vertically downward in a free fall into the bottom water receptacle, the bottom water receptacle correspondingly shaped to the free fall of the water to provide an area for catching free falling water from the top water receptacle so as to enable a multiple waterfall effect; and flexible support means of the hanging apparatus located clear of the space where the water will fall so that the water will fall freely from the top water receptacle to the bottom water receptacle; at least one plant receptacle which is capable of supporting a hanging type plant; said flexible means also supporting and hanging the plant receptacle centrally above and superjacent with respect to the top water receptacle; the plant receptacle having an outermost lateral periphery which is larger than the outermost lateral periphery of the top water receptacle so that a hanging plant can extend over said periphery of the plant receptacle and drape in space which is outward from the periphery of the top water receptacle; and fluid transfer means for fluid communication between said bottom and top water receptacles only, including pump means; the plant receptacle not in fluid communication with said water receptacles, whereby upon pumping water from the bottom water receptacle to the top water receptacle a waterfall and a hanging plant can be displayed in combination without interfering with one another.

2. A hanging apparatus as claimed in claim 1 including:
   said flexible support means comprising flexible ropes extending between the top water and bottom water receptacles; the fluid transfer means comprising
   a submersible pump of the type having an inlet and an outlet located within the bottom water receptacle; and
   a tube connected to the pump outlet and extending along at least one of the flexible ropes and into the top water receptacle.

3. A hanging apparatus as claimed in claim 1 including:
   the outermost lateral periphery of the bottom water receptacle being larger than the outermost lateral periphery of the top water receptacle.

4. A hanging apparatus as claimed in claim 1 including:
   the plant receptacle and the top water receptacle each being a pot with an open top.

5. A hanging apparatus as claimed in claim 1 including:
   a bottom plant receptacle which is supported by said flexible supporting means in a location which is below the first mentioned plant receptacle; and
   the bottom water receptacle having an outermost lateral periphery which is smaller than the outermost lateral periphery of the bottom plant receptacle and being located entirely within the outermost lateral periphery of the bottom plant receptacle.

6. A hanging apparatus as claimed in claim 5 including:
each of the top and bottom plant receptacles having a top edge which is substantially circular, and the diameters across the edges of these receptacles being substantially equal.

7. A hanging apparatus as claimed in claim 5 including:
the bottom plant receptacle being annular with a center hole which has an inside top annular edge for receiving a bottom portion of the bottom water receptacle; and
a bottom portion of the bottom water receptacle engaging the inside top annular edge of the bottom plant receptacle and being supported thereby.

8. A hanging apparatus as claimed in claim 7 including:
the top water receptacle having a series of apertures which serve as orifices for the water to drop to the bottom water receptacle; and
the apertures being arranged in a circular row.

9. A hanging apparatus as claimed in claim 5 including:
each of the receptacles having a top edge which is circular;
the top plant receptacle having a rounded bottom;
the top edge of the top water receptacle engaging the rounded bottom of the top plant receptacle;
the top water receptacle having a series of apertures for allowing the water to exit therefrom and drop to the bottom water receptacle.

10. A hanging apparatus as claimed in claim 9 including:
the bottom water receptacle mounted within the interior of the bottom plant receptacle and having a top edge which is slightly below the top edge of the bottom plant receptacle,
whereby the falls effect is water coming from the top plant receptacle and falling to the bottom plant receptacle when in reality the water is dropping from the top water receptacle to the bottom water receptacle.

11. A hanging apparatus as claimed in claim 1 including:
the plant receptacle and the top water receptacle each having a top edge which is circular;
the plant receptacle having a rounded bottom; and
the top edge of the top water receptacle engaging the rounded bottom of the plant receptacle.

12. A hanging apparatus as claimed in claim 11 including:
the plant receptacle and the bottom water receptacle each being a pot with an open top.

13. A hanging apparatus as claimed in claim 12 including:
the outermost lateral periphery of the bottom water receptacle being substantially equal in size to the outermost lateral periphery of the plant receptacle.

14. A hanging apparatus as claimed in claim 13 including:
said support means comprising flexible ropes which extend substantially vertically between the lateral peripheries of the plant receptacle and the bottom water receptacle; the fluid transfer means comprising a submersible pump of the type having an inlet and an outlet located within the bottom water receptacle; and
a tube connected to the pump outlet and extending along at least one of the flexible ropes and into the top water receptacle.

* * * * *